United States Patent
Saliya et al.

(10) Patent No.: US 8,349,407 B2
(45) Date of Patent: Jan. 8, 2013

(54) HIGH FILM BUILD COATING COMPOSITION CONTAINING POLYTRIMETHYLENE ETHER DIOL

(75) Inventors: Rajesh Gopalan Saliya, Media, PA (US); Ayumu Yokoyama, Wallingford, PA (US); Patricia Mary Ellen Sormani, Newark, DE (US); Sheau-Hwa Ma, West Chester, PA (US); Eric C. Houze, Mullica Hill, NJ (US); Delson Jayme Trindade, Rochester Hills, MI (US)

(73) Assignee: E I du Pont de Nemours and Company, Wilmington, DE (US)

( * ) Notice: Subject to any disclaimer, the term of this patent is extended or adjusted under 35 U.S.C. 154(b) by 205 days.

(21) Appl. No.: 13/005,200

(22) Filed: Jan. 12, 2011

(65) Prior Publication Data
US 2012/0177916 A1 Jul. 12, 2012

Related U.S. Application Data

(62) Division of application No. 12/489,526, filed on Jun. 23, 2009, now Pat. No. 7,910,644.

(60) Provisional application No. 61/077,633, filed on Jul. 2, 2008.

(51) Int. Cl.
*B05D 3/00* (2006.01)

(52) U.S. Cl. .................. 427/385.5; 427/384
(58) Field of Classification Search ............ None
See application file for complete search history.

(56) References Cited

U.S. PATENT DOCUMENTS

| | | |
|---|---|---|
| 4,591,533 A | 5/1986 | Antonelli et al. |
| 4,677,028 A | 6/1987 | Heeringa et al. |
| 5,010,140 A | 4/1991 | Antonelli et al. |
| 5,633,362 A | 5/1997 | Nagarajan et al. |
| 5,686,276 A | 11/1997 | Laffend et al. |
| 5,763,528 A | 6/1998 | Barsotti et al. |
| 5,821,092 A | 10/1998 | Nagarajan et al. |
| 6,221,494 B1 | 4/2001 | Barsotti et al. |
| 6,720,459 B2 | 4/2004 | Sunkara et al. |
| 6,875,514 B2 * | 4/2005 | Sormani et al. ............ 428/423.1 |
| 6,977,291 B2 | 12/2005 | Sunkara et al. |
| 2006/0042724 A1 | 3/2006 | Adams |
| 2010/0267892 A1 | 10/2010 | Corcoran |

FOREIGN PATENT DOCUMENTS

| | | |
|---|---|---|
| WO | 2009/131907 A1 | 10/2009 |
| WO | 2009/155409 A1 | 12/2009 |

* cited by examiner

*Primary Examiner* — Erma Cameron
(74) *Attorney, Agent, or Firm* — Ganin G. Xu

(57) ABSTRACT

The present disclosure is directed to a coating composition that is capable of producing coatings being sag-free at high coating thicknesses, having excellent adhesion to substrates, and good appearance. This disclosure is further directed to a coating composition comprising components derived from renewable resources.

3 Claims, No Drawings

HIGH FILM BUILD COATING COMPOSITION CONTAINING POLYTRIMETHYLENE ETHER DIOL

The application is a divisional of application Ser. No. 12/489,526, filed Jun. 23, 2009, now U.S. Pat. No. 7,910,644, which claims benefit of provisional application 61/077,633, filed Jul. 2, 2008.

FIELD OF DISCLOSURE

The present disclosure is directed to a coating composition that is capable of producing coatings being sag-free at high coating thicknesses, having excellent adhesion to substrates, and good appearance. This disclosure is further directed to a coating composition comprising components derived from renewable resources.

BACKGROUND OF DISCLOSURE

A typical coating finish over a substrate comprises some or all of the following layers: (1) one or more primer layers that provide adhesion and basic protection, and also cover minor surface unevenness of the substrate; (2) one or more colored layers, typically pigmented, that provide most of the protection, durability and color; and (3) one or more clearcoat layers that provide additional durability and improved appearance. A colored topcoat layer can be used in place of the colored layer and clearcoat layer.

In some industrial applications, such as coating metal pipes, trucks, large industrial equipments, and large entertainment equipments, it is often desired to complete the coating process in a short period of time while still achieving good adhesion, protection, durability and appearance. Conventional coating compositions for colored layers are often less optimized for good adhesion directly to metals. In addition, a conventional coating composition typically produces a thin cured dry coating layer that may not have sufficient thickness to cover unevenness of the substrate if only a single layer is used. That could result in undesired appearance. When conventional coatings are applied at a high coating thickness, surface coating defects such as microfoaming, low gloss, and sagging may occur. Thick coating layers are typically prone to sagging defects, especially for coating layers applied on vertical surfaces.

Therefore, there is a need for a coating composition that can produce a coating being sag-free at high coating thicknesses, having good direct-to-metal adhesion, and good appearance.

STATEMENT OF DISCLOSURE

This disclosure is directed to a coating composition comprising a binder consisting essentially of:
A) a crosslinkable component consisting essentially of at least one acrylic polymer having one or more crosslinkable functional groups;
B) a polytrimethylene ether diol having a Mn (number average molecular weight) in a range of from 500 to 10,000;
C) a sag control agent; and
D) a crosslinking component consisting essentially of at least one crosslinking agent having one or more crosslinking functional groups.

This disclosure is also directed to a substrate coated with the coating composition of this invention.

This disclosure is further directed to a process for forming a sag-free coating layer on a substrate, said process consisting of the steps of:
A) applying a coating composition over said substrate forming a sag-free wet coating layer having a wet coating thickness in a range of from 10 to 36 mils, wherein said coating composition comprises a binder consisting essentially of: i) a crosslinkable component consisting essentially of at least one acrylic polymer having one or more crosslinkable functional groups; ii) a polytrimethylene ether diol having a Mn (number average molecular weight) in a range of from 500 to 10,000; iii) a sag control agent; and iv) a crosslinking component consisting essentially of at least one crosslinking agent having one or more crosslinking functional groups; and
B) curing said sag-free wet coating layer to form said sag-free coating layer.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

"Gloss" means surface gloss of a coating surface and is related to the amount of incident light that is reflected at the specular reflectance angle of the mean of that surface. Gloss can be measured with a specular glossmeter, such as those available from Byk-Gardener, Geretsried, Germany.

"DOI" (Distinctness of Image) is a quantitative measure of coating appearance that measures the light reflected at and around the specular reflectance angle. It can be determined according to the method described in ASTM D 5767. DOI can be measured with wave scan instruments, such as those available from Byk-Gardener, Geretsried, Germany. DOI measures not only the amount of incident light that is reflected at the specular reflectance angle, but also the distribution of the reflected light around the reflectance specular angle, typically +/−0.3° from the specular angle. A coating surface that gives fuzzy or distorted image generally produces lower DOI reading. A coating reflecting 100% of lights at the specular angle gives a DOI reading of 100.

The term "sag" or "sagging" refers to coating defects such as dropping line, sagging curtains, tearing drops, or other defects and variations in coating that cause the coating to be un-smooth. The term "sag-free" or "free of sagging" or "free of sag" means a coating that is free of sagging defects. It is known to those skilled in the art that a thick wet coating layer tends to form sagging defects.

The term "a coating layer" or "a single coating layer" means a layer of coating formed after curing or drying of a wet coating layer of one coating composition. Such single wet coating layer can be formed by any conventional coating application methods known to those skilled in the art, such as spraying, brushing, dipping, rolling, or wet draw down.

The term "(meth)acrylate" means methacrylate or acrylate.

The term "two-pack coating composition", also known as 2K coating composition, refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The pot mix is then applied as a layer of a desired thickness on a substrate surface, such as an automobile body. After application, the layer dries and cures at ambient or at elevated temperatures to form a coating on the substrate surface having desired coating properties, such as, adhesion, high gloss, and high DOI.

The term "crosslinkable component" refers to a component having "crosslinkable functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The term "crosslinking component" refers to a component having "crosslinking functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide or a workable combination thereof.

It would be clear to one of ordinary skill in the art that certain crosslinking functional groups crosslink with certain crosslinkable functional groups. Examples of paired combinations of crosslinkable and crosslinking functional groups can include: (1) amine and protected amine such as ketimine and aldimine functional groups generally crosslink with acetoacetoxy, epoxy, or anhydride functional groups; (2) isocyanate, thioisocyanate and melamine functional groups generally crosslink with hydroxyl, thiol, primary and secondary amine, ketimine, or aldimine functional groups; (3) epoxy functional groups generally crosslink with carboxyl, primary and secondary amine, ketimine, aldimine or anhydride functional groups; and (4) carboxyl functional groups generally crosslink with epoxy or isocyanate functional groups.

The term "binder" as used herein refers to film forming constituents of a coating composition. Typically, a binder can comprise a crosslinkable component and a crosslinking component in that the crosslinkable component can react with the crosslinking component to form crosslinked structures, such as coating films. The binder in this invention can further comprise other polymers, compounds or molecules that are essential for forming crosslinked coatings having desired properties, such as good adhesion, high DOI and free of sagging at high coating thicknesses. Additional components, such as solvents, pigments, catalysts, rheology modifiers, antioxidants, UV stabilizers and absorbers, leveling agents, antifoaming agents, anti-cratering agents, or other conventional additives are not included in the term. One or more of those additional components can be included in the coating composition of this invention.

A substrate suitable for this invention can be a treated metal, bare metal such as blasted steel, aluminum or other metal or alloys. One example of the blasted steel can be the one available from East Coast Steel Inc, Columbia, S.C. 29290, USA.

The coating composition of this disclosure comprises a film forming binder, herein referred to as the binder. Said binder can consist essentially of:

A) at least one acrylic polymer having one or more crosslinkable functional groups;

B) a polytrimethylene ether diol having a Mn (number average molecular weight) in a range of from 500 to 10,000;

C) a sag control agent; and

D) a crosslinking component containing at least one crosslinking agent having one or more crosslinking functional groups.

The coating composition of this invention can be applied over a substrate with conventional coating methods known to those skilled in the art to form a sag-free coating layer. The sag-free coating layer can have a wet thickness of more than 10 mils, preferred more than 12 mils and further preferred more than 16 mils. Once cured and dried, the sag-free coating layer can have a dry coating thickness of more than 6 mils and a distinctness of image (DOI) of more than 60. In one embodiment, the dry coating thickness can be more than 6 mils. In another embodiment, the dry coating thickness can be more than 7 mils. In yet another embodiment, the DOI can be more than 60. In another embodiment, the DOI can be more than 70. In yet another embodiment, the DOI can be more than 80.

The acrylic polymer used in the composition can have a weight average molecular weight (Mw) of about 5,000 to 100,000, and a glass transition temperature (Tg) in a range of from −40° C. to 80° C. and contain functional groups or pendant moieties that are reactive with isocyanate or other crosslinking functional groups, such as, for example, hydroxyl, amino, amide, glycidyl, silane and carboxyl groups. The acrylic polymer can have Mw in a range of from 5,000 to 100,000 in one embodiment, in a range of from 6,000 to 80,000 in another embodiment, in a range of from 8,000 to 50,000 in yet another embodiment. Tg of the acrylic polymer can be I a range of from −40° C. to 80° C. in one embodiment, −40° C. to 5° C. in another embodiment, 5° C. to 80° C. in yet another embodiment. The Tg of the acrylic polymer can be measured experimentally or calculated according to the Fox Equation. These acrylic polymers can be straight chain polymers, branched polymers, block copolymers, graft polymers, graft terpolymers or core shell polymers.

The acrylic polymers can be polymerized from a plurality of monomers, such as acrylates, methacrylates or derivatives thereof.

Suitable monomers can include linear alkyl(meth)acrylates having 1 to 12 carbon atoms in the alkyl group, cyclic or branched alkyl(meth)acrylates having 3 to 12 carbon atoms in the alkyl group, including isobornyl(meth)acrylate, styrene, alpha methyl styrene, vinyl toluene, (meth)acrylonitrile, (meth)acryl amides and monomers that provide crosslinkable functional groups, such as, hydroxy alkyl(meth)acrylates having 1 to 4 carbon atoms in the alkyl group, glycidyl(meth)acrylate, amino alkyl(meth)acrylates having 1 to 4 carbon atoms in the alkyl group, (meth)acrylic acid, and alkoxy silyl alkyl(meth)acrylates, such as, trimethoxysilylpropyl(meth)acrylate. Particularly, monomers having inherent low Tg properties can be suitable for deriving low Tg acrylic polymers when desired. Examples of low Tg monomers include butyl acrylate (Tg about −54° C.), 2-ethylhexyl acrylate (Tg about −50° C.), ethyl acrylate (Tg about −24° C.), isobutyl acrylate (Tg about −24° C.), and 2-ethylhexyl methacrylate (Tg about −10° C.). Monomers having inherent high Tg properties can be suitable for deriving high Tg acrylic polymers when desired. Examples of such high Tg monomers can include styrene (Tg: 100° C.), methyl methacrylate (MMA) (Tg: about 105° C.), isobornyl methacrylate (IBOMA) (Tg: about 165° C.), isobornyl acrylate (IBOA) (Tg: about 94° C.), cyclohexyl methacrylate (CHMA) (Tg: about 83° C.), and isobutyl methacrylate (IBMA) (Tg: about 55° C.). The above-mentioned Tg values are derived from published literatures and are commonly accepted in the industry. Theoretical Tgs of the acrylic polymers can be predicted using the Fox equation based on Tgs of the monomers. Actual Tg's of the finished polymers can be measured by DSC (Differential Scanning calorimetry, also available as ASTM D3418/E1356).

Suitable monomers can also include, for example, hydroxyalkyl esters of alpha,beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. Examples of suitable hydroxyalkyl esters of alpha,beta-olefinically unsaturated monocarboxylic acids with primary hydroxyl groups can include hydroxyethyl (meth)acrylate, hydroxypropyl(meth)acrylate, hydroxybutyl (meth)acrylate, hydroxyamyl(meth)acrylate, hydroxyhexyl (meth)acrylate. Examples of suitable hydroxyalkyl esters with secondary hydroxyl groups can include 2-hydroxypropyl(meth)acrylate, 2-hydroxybutyl(meth)acrylate, 3-hydroxybutyl(meth)acrylate. Low Tg monomers, such as hydroxyl functional monomers, such as 2-hydroxyethyl acrylate (Tg: −15° C.) and hydroxypropyl acylate (Tg: −7° C.) can be useful in decreasing Tg of the acrylic polymer to produce low Tg acrylic polymers and providing the crosslinkable functional groups. When high Tg acrylic polymers are desired, one or more high Tg monomers can be included. Examples of such high Tg hydroxyl monomers can include hydroxyethyl methacrylate (HEMA) (Tg: about 55° C.) and hydroxypropyl methacrylate (HPMA) (Tg: about 76° C.).

Suitable monomers can also include monomers that are reaction products of alpha,beta-unsaturated monocarboxylic acids with glycidyl esters of saturated monocarboxylic acids branched in alpha position, for example with glycidyl esters of saturated alpha-alkylalkanemonocarboxylic acids or alpha,alpha'-dialkylalkanemonocarboxylic acids. These can comprise the reaction products of (meth)acrylic acid with glycidyl esters of saturated alpha,alpha-dialkylalkanemonocarboxylic acids with 7 to 13 carbon atoms per molecule, particularly preferably with 9 to 11 carbon atoms per molecule. These reaction products can be formed before, during or after copolymerization reaction of the acrylic polymer.

Suitable monomers can further include monomers that are reaction products of hydroxyalkyl(meth)acrylates with lactones. Hydroxyalkyl(meth)acrylates which can be used include, for example, those stated above. Suitable lactones can include, for example, those that have 3 to 9 carbon atoms in the ring, wherein the rings can also comprise different substituents. Examples of lactones can include gamma-butyrolactone, delta-valerolactone, epsilon-caprolactone, beta-hydroxy-beta-methyl-delta-valerolactone, lambda-laurolactone or a mixture thereof. In one example, the reaction products can comprise those prepared from 1 mole of a hydroxyalkyl ester of an alpha,beta-unsaturated monocarboxylic acid and 1 to 5 moles, preferably on average 2 moles, of a lactone. The hydroxyl groups of the hydroxyalkyl esters can be modified with the lactone before, during or after the copolymerization reaction.

Suitable monomers can also include unsaturated monomers such as, for example, allyl glycidyl ether, 3,4-epoxy-1-vinylcyclohexane, epoxycyclohexyl(meth)acrylate, vinyl glycidyl ether and glycidyl(meth)acrylate, that can be used to provide the acrylic polymer with glycidyl groups. In one example, glycidyl(meth)acrylate can be used.

Suitable monomers can also include monomers that are free-radically polymerizable, olefinically unsaturated monomers which, apart from at least one olefinic double bond, do not contain additional functional groups. Such monomers include, for example, esters of olefinically unsaturated carboxylic acids with aliphatic monohydric branched or unbranched as well as cyclic alcohols with 1 to 20 carbon atoms. Examples of the unsaturated carboxylic acids can include acrylic acid, methacrylic acid, crotonic acid and isocrotonic acid. In one embodiment, esters of (meth)acrylic acid can be used. Examples of esters of (meth)acrylic acid can include methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of esters of (meth)acrylic acid with cyclic alcohols can include cyclohexyl acrylate, trimethylcyclohexyl acrylate, 4-tert.-butylcyclohexyl acrylate, isobornyl acrylate and the corresponding methacrylates.

Suitable monomers can also include unsaturated monomers that do not contain additional functional groups for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers can include styrene, alpha-methylstyrene, chlorostyrenes, 2,5-dimethylstyrene, p-methoxystyrene, vinyl toluene. In one embodiment, styrene can be used.

Suitable monomers can also include small proportions of olefinically polyunsaturated monomers. These olefinically polyunsaturated monomers are monomers having at least 2 free-radically polymerizable double bonds per molecule. Examples of these olefinically polyunsaturated monomers can include divinylbenzene, 1,4-butanediol diacrylate, 1,6-hexanediol diacrylate, neopentyl glycol dimethacrylate, and glycerol dimethacrylate.

The acrylic polymers of this disclosure can generally be polymerized by free-radical copolymerization using conventional processes well known to those skilled in the art, for example, bulk, solution or bead polymerization, in particular by free-radical solution polymerization using free-radical initiators.

The acrylic polymer can contain (meth)acrylamides. Typical examples of such acrylic polymers can be polymerized from monomers including (meth)acrylamide. In one example, such acrylic polymer can be polymerized from (meth)acrylamide and alkyl(meth)acrylates, hydroxy alkyl (meth)acrylates, (meth)acrylic acid and one of the aforementioned olefinically unsaturated monomers.

The polytrimethylene ether diol suitable for the coating composition of this disclosure can have a number average molecular weight (Mn) in the range of from 500 to 10,000, preferably 500 to 8,000, even preferably 500 to 4,000. The polytrimethylene ether diol has a Tg of about −75° C., a polydispersity in the range of from 1.1 to 2.1 and a hydroxyl number in the range of from 20 to 200.

Suitable polytrimethylene ether diol can be prepared by an acid-catalyzed polycondensation of 1,3-propanediol, such as described in U.S. Pat. Nos. 6,977,291 and 6,720,459. The polytrimethylene ether diol can also be prepared by a ring opening polymerization of a cyclic ether, oxetane, such as described in J. Polymer Sci., Polymer Chemistry Ed. 28, 449 to 444 (1985). The polycondensation of 1,3-propanediol is preferred over the use of oxetane since the diol is a less hazardous, stable, low cost, commercially available material and can be prepared by use of petro chemical feed-stocks or renewable resources.

A bio-route via fermentation of a renewable resource can be used to obtain the 1,3-propanediol. One example of renewable resources is corn since it is readily available and has a high rate of conversion to 1,3-propanediol and can be genetically modified to improve yields to the 1,3-propanediol. Examples of typical bio-route can include those described in U.S. Pat. No. 5,686,276, U.S. Pat. No. 5,633,362 and U.S. Pat. No. 5,821,092.

Copolymers of polytrimethylene ether diol also can be suitable for the coating composition of this disclosure. Examples of such suitable copolymers of polytrimethylene ether diol can be prepared by copolymerizing 1,3-propanediol with another diol, such as, ethane diol, hexane diol, 2-methyl-1,3-propanediol, 2,2-dimethyl-1,3-propanediol, trimethylol propane and pentaerythritol. In one example, the copolymers of polytrimethylene ether diol can be polymerized from monomers have 1,3-propanediol in a range of from 50% to 99%. In another example, the copolymers of polytrimethylene ether diol can be polymerized from monomers have 1,3-propanediol in a range of from 60% to 99%. In yet another example, the copolymers of polytrimethylene ether diol can be polymerized from monomers have 1,3-propanediol in a range of from 70% to 99%.

A blend of a high and a low molecular weight polytrimethylene ether diol can be used. In one example, the high molecular weight polytrimethylene ether diol can have an Mn in a range of from 1,000 to 4,000 and the low molecular weight polytrimethylene ether diol can have an Mn in a range of from 150 to 500. The average Mn of the blended polytrimethylene ether diol can be in a range of from 500 to 4,000. In another example, the high molecular weight polytrimethylene ether diol can have an Mn in a range of from 1,000 to 4,000 and the low molecular weight polytrimethylene ether diol can have an Mn in a range of from 150 to 500 and the average Mn of the blend can be in a range of from 500 to 3,000.

Blends of the polytrimethylene ether diol and other cycloaliphatic hydroxyl containing either branched or linear oligomers can be used. Such hydroxyl containing oligomers are known to those skilled in the art. Examples of such hydroxyl containing oligomers can include those disclosed by Barsotti, et al. in U.S. Pat. No. 6,221,494.

Sag control agent, hereafter referred to as SCA, is typically used to control sagging and therefore improving appearance of a coating. In an example, said SCA can be a reaction product of an isocyanate and an amine. Said SCA can be produced with conventional methods known to those skilled in the art. Said SCA can be produced in the presence or in the absence of one or more acrylic polymers or a binder. One example of such conventional methods is described in U.S. Pat. No. 4,677,028. Microstructures of the SCA can be modified by selecting the isocyanate and the amine, and synthetic conditions. The SCA can also be made in a way that they are soluble in a polar solvent such as N-methylpyrrolidone to form a SCA solution. Such SCA solution can be conveniently added directly to a coating to achieve the desired rheology or sag control effect. One example of such SCA solution is commercially available as Byk® 410 from Byk Chemie GmbH, Wesel, Germany, sold under respective registered trademark.

Suitable isocyanates for synthesizing said SCA can include blocked or un-blocked aliphatic, cycloaliphatic, heterocyclo, or aromatic di-, tri- or multivalent isocyanates. Examples of suitable diisocyanates can include 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophoron diisocyanate, the adduct of 1 molecule of 1,4-butanediol and 2 molecules of isophoron diisocyanate, the adduct of 1 molecule of 1,4-butanediol and 2 molecules of hexamethylene diisocyanate, dicyclohexylmethane-4,4'-diisocyanate, xylylene diisocyanate, 1,3,5-trimethyl-2,4-bis (isocyanatomethyl)benzene, toluene diisocyanate, diphenylmethane-4,4'-diisocyanate, adducts of hexamethylene diisocyanate, adducts of isophoron diisocyanate, and adducts of toluene diisocyanate. Isocyanurate-trimers that built up from diisocyantes can also be suitable. A combination of the isocyantes can also be suitable. Any of the isocyanates mentioned in the examples above can be blocked or unblocked.

Amines suitable for the SCA can include primary amines. Examples of primary amines can include benzyl amine, ethylamine, n-propylamine, 2-propylamine, n-butylamine, 2-butylamine, t-butylamine, n-pentylamine, α-methylbutylamine, α-ethylpropylamine, β-ethylbutylamine, hexylamine, octylamine, decylamine, stearylamine, cyclohexylamine, and aniline. A combination of the amines can also be suitable.

The SCAs produced by aforementioned process are typically free from un-reacted iscocyanates since excess amount of amine is normally used.

Typically, the coating composition of this invention can comprise in a range of from 0.1% to 10% of the SCA, weight percent of the total weight of the binder. The coating composition can comprise in a range of from 0.1% to 10% of the SCA in one example, 0.2% to 8% in another example, 0.2% to 5% in yet another example, weight percent of the total weight of the binder. If a SCA solution such as BYK® 410 is used, polarity of solvent or solvent mix may need to be adjusted according to manufacturer's instruction so the SCA can be dispersed into the coating without separation.

The crosslinking agents that are suitable for the coating composition of this disclosure include compounds having crosslinking functional groups. Examples of such compounds can be organic polyisocyanates. Examples of organic polyisocyanates include aliphatic polyisocyanates, cycloaliphatic polyisocyanates, aromatic polyisocyanates and isocyanate adducts.

Examples of suitable aliphatic, cycloaliphatic and aromatic polyisocyanates that can be used include the following: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4,4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexyl-methane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4,6-toluene triisocyanate. Trimers of diisocyanates, such as, the trimer of hexamethylene diisocyanate, sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine. Also, any of the aforementioned polyisocyanates can be used with a polyol to form an adduct. Polyols, such as, trimethylol alkanes, particularly, trimethylol propane or ethane can be used to form an adduct.

The coating composition of this invention can contain in a range of from 1% to 50% by weight in one embodiment, in a range of from 10% to 40% by weight in another embodiment, in a range of from 20% to 40% by weight in yet another embodiment, based on the weight of the binder, of acrylic NAD (non-aqueous dispersed) resins. These NAD resins typically can include high molecular weight resins having a crosslinked acrylic core with a Tg between 20 to 100° C. and attached to the core are low Tg stabilizer segments. Examples of such NAD resins can include those disclosed in U.S. Pat. No. 4,591,533, U.S. Pat. No. 5,010,140 and U.S. Pat. No. 5,763,528.

Typically, a catalyst can be used in the coating composition of this invention to reduce curing time and to allow curing of the coating composition at ambient temperatures. The ambient temperatures are typically referred to as temperatures in a range of from range of 18° C. to 35° C. Typical catalysts include organic metal salts, such as, dibutyl tin dilaurate, dibutyl tin diacetate, dibutyl tin dichloride, dibutyl tin dibromide, zinc naphthenate; compounds containing tertiary amino groups, such as, triethylamine; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

The coating composition of this invention can comprise one or more solvents. Typically the coating composition can comprise up to 80% by weight, based on the weight of the coating composition, of one or more solvents. Typically, the coating composition of this invention can have a solid content in a range of from 20% to 80% by weight in one example, in a range of from 50% to 80% by weight in another example and in a range of from 60% to 80% by weight in yet another example, all based on the total weight of the coating composition. The coating composition of this invention can also be formulated at 100% solids by using a low molecular weight acrylic resin reactive diluent known to those skilled in the art.

Any typical organic solvents can be used to form the coating composition of this invention. Examples of solvents can include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof.

Typically, when the coating composition of this invention is utilized as a pigmented coating composition, it contains pigments in a pigment to binder weight ratio of 1/100 to 350/100. The coating composition can be used as a basecoat or topcoat, such as a colored topcoat. Conventional inorganic and organic colored pigments, metallic flakes and powders, such as, aluminum flake and aluminum powders; special effects pigments, such as, coated mica flakes, coated aluminum flakes colored pigments, or a combination thereof can be used. Transparent pigments or pigments having the same refractive index as the cured binder can also be used. Such transparent pigments can be used in a pigment to binder weight ratio of 0.1/100 to 5/100. One example of such transparent pigment is silica.

The coating composition of this invention can also comprise one or more ultraviolet light stabilizers in the amount of 0.1% to 10% by weight, based on the weight of the binder. Examples of such ultraviolet light stabilizers can include ultraviolet light absorbers, screeners, quenchers, and hindered amine light stabilizers. An antioxidant can also be added to the coating composition, in the amount of about 0.1% to 5% by weight, based on the weight of the binder.

Typical ultraviolet light stabilizers that are suitable for this invention can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals, Tarrytown, N.Y., under respective registered trademark, can be used.

Typical ultraviolet light absorbers that are suitable for this invention can include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Typical hindered amine light stabilizers can include N-(1,2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanediyl]]bis[N,N''''-dibutyl-N',N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl) methyl]butyl propanedioate, 8-acetyl-3-dodecyl-7,7,9,9,-tetramethyl-1,3,8-triazaspiro(4,5)decane-2,4-dione, and dodecyl/tetradecyl-3-(2,2,4,4-tetramethyl-2I-oxo-7-oxa-3, 20-diazal dispiro(5.1.11.2)henicosan-20-yl)propionate.

Typical antioxidants that are suitable for this invention can include tetrakis[methylene(3,5-di-tert-butylhydroxy hydrocinnamate)]methane, octadecyl 3,5-di-tert-butyl-4-hydroxy-hydrocinnamate, tris(2,4-di-tert-butylphenyl) phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-C7-C9 branched alkyl esters. Typically useful antioxidants can also include hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

The coating compositions of this invention can comprise conventional coating additives. Examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective registered tradmarks, leveling agents based on (meth)acrylic homopolymers; rheological control agents, such as highly disperse silica, or fumed silica; thickeners, such as partially crosslinked polycarboxylic acid or polyurethanes; and antifoaming agents. The additives are used in conventional amounts familiar to those skilled in the art.

The coating compositions according to this invention can further contain reactive low molecular weight compounds as reactive diluents that are capable of reacting with the crosslinking agent. For example, low molecular weight polyhydroxyl compounds, such as, ethylene glycol, propylene glycol, trimethylolpropane and 1,6-dihydroxyhexane can be used.

Depending upon the type of crosslinking agent, the coating composition of this invention can be formulated as one-pack (1K) or two-pack (2K) coating composition. If polyisocyanates with free isocyanate groups are used as the crosslinking agent, the coating composition can be formulated as a two-pack coating composition in that the crosslinking agent is mixed with other components of the coating composition only shortly before coating application. If blocked polyisocyanates are, for example, used as the crosslinking agent, the coating compositions can be formulated as a one-pack (1K) coating composition. The coating composition can be further adjusted to spray viscosity with organic solvents as determined by those skilled in the art before being applied.

In a typical two-pack coating composition comprising two packages, the two packages are mixed together shortly before application. The first package typically can contain the binder including the polymer having one or more hydroxyl crosslinkable functional groups, the polytrimethylene ether diol and the sag control agent. Optionally, one or more pigments can be dispersed in the first package using conventional dispersing techniques, for example, ball milling, sand milling, and attritor grinding. The second package can contain the crosslinking agent, such as, a polyisocyanate crosslinking agent, and solvents.

The coating composition according to the disclosure can be suitable for vehicle and industrial coating and can be applied using known processes. In the context of vehicle coating, the coating composition can be used both for vehicle original equipment manufacturing (OEM) coating and for repairing or refinishing coatings of vehicles and vehicle parts. Curing of the coating composition can be accomplished at ambient temperatures, such as temperatures in a range of from 18° C. to 35° C., or at elevated temperatures, such as at temperatures in a range of from 35° C. to 150° C. Typical curing temperatures of 20° C. to 80° C., in particular of 20° C. to 60° C., can be used for vehicle repair or refinish coatings.

The coating composition can be applied by conventional techniques, such as, spraying, electrostatic spraying, dipping, brushing, and flow coating. Typically, the coating can be applied to a substrate to form a sag-free coating layer having a wet coating thickness, also known as wet film thickness (wft), in a range of, in one example from 5 to 36 mils (about 127 to 914 microns), in another example from 6 to 36 mils (about 152 to 914 microns), in yet another example from 7 to 36 mils (about 178 to 914 microns), in yet another example from 8 to 36 mils (about 203 to 914 microns), in yet another example from 10 to 36 mils (about 254 to 914 microns), in yet another example from 12 to 36 mils (about 305 to 914 microns), in yet another example from 14 to 36 mils (about 356 to 914 microns), and in yet further example from 16 to 36 mils (about 406 to 914 microns). After curing and drying, dry coating thickness can be typically in a range of from 2 to 20 mils. A dry coating thickness can be 2 to 20 mils in one example, 4 to 20 mils in another example, 6 to 20 mils in yet another example, and 7 to 20 mils in further another example.

The use of polytrimethylene ether diol in coating compositions has been described in U.S. Pat. Nos. 6,875,514 and 7,169,475. The polytrimethylene ether diol is believed to provide improved flexibility to a coating therefore improving chip resistance. The coatings disclosed in the above mentioned US patents generally require additional sanding or buffing.

Sag control agents (SCAs) that are reaction products of primary amines and triisocyanates have been disclosed in aforementioned U.S. Pat. No. 4,677,028. However, coatings disclosed in the U.S. Pat. No. 4,677,028 started showing sagging at a dry coating thickness of about 2.2 mils (55 microns) to 3.9 mils (100 microns).

The Applicants unexpectedly discovered that a combination of polytrimethylene ether diol and SCA can produce a coating layer that has sag-free wet coating thickness higher than 10 mils (about 254 microns) and a corresponding dry coating thickness of more than 6 mils (about 152 microns) with excellent adhesion, high gloss and good DOI.

Advantages of the coating composition of this invention can include direct to metal coating application without a primer layer and high dry film build. Some substrates, such as blasted steel, may have certain surface profile with surface unevenness in a range of 1-5 mils. A thin coating with a dry coating thickness of about 1-5 mils may not cover the surface unevenness resulting in uneven coating and unacceptable coating appearance. To form a 5 mil dry coating layer, typically a wet coating layer having a wet coating thickness of 10 mils or more can be needed. As described in aforementioned U.S. Pat. No. 4,677,028, coating compositions typically start to show sagging when a dry coating thickness reaches about 2.2 mils (55 microns) to 3.9 mils (100 microns) even in the presence of sag control agents. To achieve desired total dry film thickness and desired appearance, in a traditional process, multiple coating layers have to be applied in succession wherein each coating layer needs to be dried before a subsequent coating layer can be applied thereon. Sanding may be needed between coatings. Such traditional process requires multiple steps to apply multiple coat layers and can be time consuming leading to low productivity. The coating composition of this invention can be used to directly apply over a metal substrate producing a sag-free coating layer having a dry coating thickness of 6 mils or more. In one example, a sage-free coating layer of 6 mils can be produced by applying a single layer of the coating composition over a substrate. In another example, a sage-free coating layer of 7 mils can be produced by applying a single layer of the coating composition over a substrate. The use of the coating composition of this invention can provide improvement to coating productivity.

This invention is also directed to a process for forming a sag-free coating layer on a substrate. Said process can consist of the steps of:
  A) applying a coating composition over said substrate forming a sag-free wet coating layer having a wet coating thickness in a range of from 10 to 36 mils, wherein said coating composition comprises a binder consisting essentially of: i) a crosslinkable component consisting essentially of at least one acrylic polymer having one or more crosslinkable functional groups; ii) a polytrimethylene ether diol having a Mn (number average molecular weight) in a range of from 500 to 10,000; iii) a sag control agent; and iv) a crosslinking component consisting essentially of at least one crosslinking agent having one or more crosslinking functional groups; and
  B) curing said sag-free wet coating layer to form said sag-free coating layer.

Said sag-free wet coating layer can have a wet coating thickness in a range of from 10 to 36 mils in one embodiment, 12 to 36 mils in another embodiment, and 16 to 36 mils in yet another embodiment. The sag-free coating formed by this invention can have a dry coating thickness in a range of from 2 to 20 mils. The dry coating thickness can be, in one embodiment in a range of from 2 to 20 mils, in another embodiment in a range of from 6 to 20 mils and in yet another embodiment in a range of from 7 to 20 mils.

The sag-free coating layer formed by this invention can have a distinctness of image (DOI) in a range of from 60 to 100 in one embodiment, 70 to 100 in another embodiment, and 80 to 100 in yet another embodiment.

One advantage of this invention is that a sag-free coating layer of high thickness, such as the one having dry coating thickness of more than 6 mils can be formed with a single wet coating layer without the needs for repeatedly drying and applying multiple coating layers.

Testing Procedures

Dry Film Thickness—test method ASTM D4138

Viscosity—can be measured using (1) Zahn Viscosity as determined using a #1 Zahn cup according to ASTM D 1084 Method D; (2) Gardner-Holdt Letter scale according to ASTM D1545; or (3) Brookfield viscometer; as specified.

Tg (glass transition temperature) of a polymer is determined according to ASTM D-3418 (1988) or calculated according to the Fox Equation.

Molecular weight and hydroxyl number of the polytrimethylene ether diol are determined according to ASTM E222.

Molecular weights Mw and Mn and the polydispersity (Mw/Mn) of the acrylic polymer and other polymers are determined by GPC (Gel Permeation Chromatography) using polystyrene standards and tetrahydrofuran as the solvent.

Cross-Hatch Adhesion Test—The cross hatch tape test is primarily intended for use in the laboratory. A cross-hatch pattern is created using a special cross-hatch cutter with multiple preset blades can be used to make parallel incisions with proper space. After the tape has been applied and pulled off, the cut area is inspected and rated. The foregoing test is based on a standard method for the application and performance of these adhesion tests available in ASTM D3359 B. Adhesion can be rated on a sliding scale, which ranges from 0B (no adhesion, i.e., total failure) to 5B (complete adhesion, i.e., total success). A rating of 3B and higher is preferable and a rating of 9 and higher is more preferable. A device described in U.S. Patent Publication No. 2006/0042724, published on Mar. 2, 2006, filed on Jun. 16, 2005 with an application Ser. No. 11/154,487, can be used to create properly spaced and parallel incisions into the coating.

Dry to touch time—Dry to touch time is determined by ASTM D1640.

Tack Free Time—Tack free time was determined with Mechanical Test Method according to ASTM D 1640—95. Said mechanical test method was originally described in U.S. Pat. No. 2,406,989.

DOI—Instrumental measurement of distinctness of Image (DOI) gloss of coating surfaces is determined according to ASTM D 5767.

Sag measurement—Sagging of coatings was measured according to ASTM D 4400 using a multinotch applicator. In brief, a coating composition is applied to a panel to form coating stripes at different thickness using the multinotch applicator. The panel is then positioned vertically with the coating stripes across the panel horizontally. Each stripe is visually examined for sagging. Film thickness of the thickest coating stripe that is sag free is recorded in mils (1 mil=0.0254 mm=0.001 inch). Wet film thickness, also referred to as wet coating thickness, can be determined based on indications of the multinotch applicator used for coating or with other instruments or methods known to those skilled in the art. Examples of commercially available instruments include wet film thickness measuring wheels or combs. Dry film thickness can be determined with aforementioned method.

Gloss—measured with standard test method for specular gloss according to ASTM D 523.

In the following examples, all parts and percentages are on a weight basis unless otherwise indicated. "Mw" weight average molecular weight and "Mn" means number average molecular weight.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Procedure 1

Preparation of Acrylic Polymers (A) Low Tg Acrylic Polymer

Low Tg acrylic polymers were formed by free-radical copolymerization using conventional processes well known to those skilled in the art. The process is briefly described here. Charge to a reactor equipped with a stirrer, reflux condenser and under nitrogen 13.7 parts t-butylacetate. Heat to reflux, at approximately 96° C. Premix a monomer mixture of 8.8 parts methyl methacrylate, 5.9 parts styrene, 11.7 parts hydroxyethyl methacrylate, 20.5 parts n-butyl acrylate, 11.7 parts 2-ethylhexyl methacrylate, 1.2 parts t-butylacetate. Premix an initiator mixture of 3.4 parts Vazo® 67 (Vazo® 67 is available from E. I. DuPont de Nemours and Company, Wilmington, Del., USA, and under respective registered trademark) and 23.2 parts t-butylacetate. Feed monomer mixture over 390 minutes at reflux simultaneously with the initiator mixture. Feed initiator mixture over 400 minutes. After the initiator mixture feed was complete, hold 30 minutes at reflux. Then cool to room temperature. The acrylic polymer resin produced has a calculated Tg of +2.2° C., 46.7 wt % solids, Gardner-Holdt viscosity B in Gardner-Holdt Letter scale according to ASTM D1545, and weight average molecular weight (Mw) of 9455.

(B) High Tg Acrylic Polymer

High Tg acrylic polymers were formed by similar free-radical copolymerization as described above with different monomer ratio as described below. Charge to a reactor equipped with a stirrer, reflux condenser and under nitrogen 13.7 parts t-butylacetate. Heat to reflux, at approximately 96° C. Premix a monomer mixture of 14.6 parts methyl methacrylate, 5.9 parts styrene, 11.7 parts hydroxyethyl methacrylate, 14.6 parts n-butyl acrylate, 11.7 parts 2-ethylhexyl methacrylate, 1.2 parts t-butylacetate. Premix an initiator mixture of 3.4 parts Vazo® 67 (Vazo® 67 is available from E. I. DuPont de Nemours and Company, Wilmington, Del., USA, and under respective registered trademark) and 23.2 parts t-butylacetate. Feed monomer mixture over 360 minutes at reflux simultaneously with the initiator mixture. Feed initiator mixture over 390 minutes. After the initiator mixture feed was complete, hold 60 minutes at reflux. Then cool to room temperature.

The acrylic polymer resin produced herein had the following characteristics: a calculated Tg of +17.6° C., solids 60%, Gardner-Holdt viscosity Y+114, and weight average molecular weight (Mw) of 10,000.

Procedure 2

Preparation of Sag Control Agent (A) SCA in Low Tg Acrylic Polymer

Benzyl amine (available from BASF, Florham Park, N.J.) 1.7% by wt was mixed with 1.34% by wt of 1,6 Hexamethylene Diiscocyanate (available from Bayer Material Science, Pittsburg, Pa., USA), in the presence of 96.36% by wt of the low Tg polymer Joncryl 924 (Tg=−5° C.) available from BASF Resins, Sturtevant, Wis., USA. The reaction was stirred for 5 minutes.

(B) SCA in High Tg Acrylic Polymer

Benzyl amine (available from BASF, Florham Park, N.J.) 1.7% by wt was mixed with 1.34% by wt of 1,6 Hexamethylene Diiscocyanate, in the presence of 96.36% by wt of the high Tg acrylic polymer (Tg=17.6° C.) from Procedure 1 (B). The reaction was stirred for 5 minutes.

Coating Compositions

Coating compositions were prepared according to Table 1.

TABLE 1

Coating Compositions (in weight part).

| | Comp 1 | Comp 2 | Comp 3 | Example 1 | Example 2 |
|---|---|---|---|---|---|
| Low Tg Acrylic polymer [1] | — | — | — | — | 18 |
| Low Tg acrylic polymer Joncryl 924 [2] | — | — | — | — | 45 |
| High Tg Acrylic polymer [3] | 63.0 (45) | 63.0 | 63.0 | 63.0 (45) | — |
| Polytrimethylene ether diols [4] | — | 10.0 | 10.0 | 10.0 | 10.0 |
| SCA [5] | 1.36 | — | — | 1.36 | 1.36 |
| Fumed Silica [6] | — | — | 1.36 | — | — |
| PPG2000 [7] | 10.0 | — | — | — | — |
| Bentone SD2 [8] | — | 1.36 | — | — | — |
| Tertiary butyl acetate | 5.0 | 5.0 | 5.0 | 5.0 | 5.0 |
| p-Chlorobenzotrifluoride | 14.0 | 14.0 | 14.0 | 14.0 | 14.0 |
| 2-Ethyl Hexyl Acetate | 0.8 | 0.8 | 0.8 | 0.8 | 0.8 |

TABLE 1-continued

Coating Compositions (in weight part).

| | Comp 1 | Comp 2 | Comp 3 | Example 1 | Example 2 |
|---|---|---|---|---|---|
| Tint [9] | 80.6 | 80.6 | 80.6 | 80.6 | 80.6 |
| Isocyanates crosslinking agent (Desmodur-N3330) [10] | 18.88 | 18.88 | 18.88 | 18.88 | 18.88 |
| Total | 193.64 | 193.64 | 193.64 | 193.64 | 193.64 |

[1] Low Tg Acrylic polymer was from Procedure 1 (A). The amounts shown in parentheses represent the amount of the polymer used for preparing the SCA as described in Procedure 2.
[2] Low Tg acrylic Joncryl 924, Tg = −5° C., available from BASF Resins, Sturtevant, WI, USA. Joncryl 924 was mixed with the SCA during the SCA synthesis as described in Procedure 2(A).
[3] High Tg acrylic polymer was from Procedure 1 (B). The amounts shown in parentheses represent the amount of the polymer used for preparing the SCA as described in Procedure 2(B).
[4] Polytrimethylene ether diols were prepared according to the process described in U.S. Pat. No. 6,875,514, col. 9, line 29 through col. 10, line 8. Characteristics of the polytrimethylene ether diols include: number average molecular weight (Mn) was about 1,300-1,450, hydroxyl number of 77.4-86.3 and a glass transition temperature (Tg) of about −75° C.
[5] SCA (sag control agent) was produced according to the Procedure 2 in the amount of polymer as shown in parentheses for Comparative 1 and Example 1. The amount of low Tg polymer Joncryl 924 used for SCA synthesis for Example 2 is shown separately in the Table.
[6] Fumed Silica: Fumed silica with hydrophobic surface treatment, sold as Aerosil ® R-972 available from Evonik Degussa, Frankfurt, Germany, under respective registered trademark.
[7] PPG2000: polypropylene glycol having a molecular weight of 2000 from Aldrich Chemical Company, Product No. 81380.
[8] Bentone ® SD2: organophilic clay, available from Elementis Specialties, Inc., Hightstown, NJ, USA, under respective registered trademark.
[9] Tint: The tint used was 725P ™ which is a green Imron ® Tint available from E. I. DuPont de Nemours and Company, Wilmington, DE, USA, under respective trademark or registered trademark.
[10] Desmodur ® N3330: aliphatic polyisocyanate HDI trimer, available from Bayer MaterialScience, Pittsburgh, PA, USA, under respective registered trademark.

Coating Properties

The coating compositions were applied on 4×12" blasted steel panels available from East Coast Steel Incorporated, Salina Rd, Sewell, N.J., USA), using wet draw down forming a dry coating layer at about desired thickness.

Tack free time of the coating layers was measured as described in "Testing Procedures". Adhesion was measured using the aforementioned Cross-Hatch adhesion test. A score of 0B indicates total failure on adhesion. A score of 5B indicates perfect adhesion.

Coating property data are shown in Table 2. The data indicated that examples of the coating composition of this disclosure, Examples 1 and 2 had good adhesion to the steel panel substrates, improved gloss at 20°, good DOI, high wet coating thickness of 16 mils (about 406 microns), and high dry coating thickness of 7.2 mils (183 microns).

Comparative 1 failed to adhere to the substrate and had a long dry time as measured by tack free time making it not suitable for practical use. The use of other rheology control agents, such as Benton or fumed silica as described in Comparatives 2 and 3 failed to produce sag-free coating with wet coating thickness, also known as wet film thickness (wft), greater than 12 mils while maintain high gloss and DOI.

Comparative 2 had improved adhesion and shorter dry time, however, had a maximum sag-free wet coating thickness of 12 mils. Dry coating thickness for Comparative 2 was below 6 mils. Comparative 2 also had low gloss and low DOI. Comparative 3 had sag-free wet coating thickness of 8 mils, low gloss and low DOI. Dry coating thickness for Comparative 3 was below 4 mils.

TABLE 2

Coating Properties.

| | Comp 1 | Comp 2 | Comp 3 | Example 1 | Example 2 |
|---|---|---|---|---|---|
| Adhesion to Steel Panel | 0B | 4B | 4B | 5B | 5B |
| Gloss at 20° | 82.7 | 74.6 | 81.5 | 83.6 | 85.4 |
| Sag-Free Wet Coating Thickness (mils) | 8 | 12 | 8 | 16 | 16 |
| Sag-Free Dry Film Thickness (mils) | 3.6 | 5.4 | 3.6 | 7.2 | 7.2 |
| DOI | 83.82 | 53.04 | 74.69 | 82.07 | 90.51 |
| Tack Free Time (hours) | 48 | 8 | 8 | 8 | 9 |

What is claimed is:

1. A process for forming a sag-free coating layer on a substrate, said process consisting of the steps of:
   A) applying a coating composition over said substrate forming a sag-free wet coating layer having a wet coating thickness in a range of from 10 to 36 mils, wherein said coating composition comprises a binder consisting essentially of: i) a crosslinkable component consisting essentially of at least one acrylic polymer having one or more crosslinkable functional groups; ii) a polytrimethylene ether diol having a Mn (number average molecular weight) in a range of from 500 to 10,000; iii) a sag control agent consisting essentially of a reaction product of an amine and an isocyanate in the presence of said at least one acrylic polymer; and iv) a crosslinking component consisting essentially of at least one crosslinking agent having one or more crosslinking functional groups; and
   B) curing said sag-free wet coating layer to form said sag-free coating layer,
   wherein said sag free coating layer having a dry sag free coating layer thickness in a range of from 6 mils to 20 mils.

2. The process of claim 1, wherein said sag-free wet coating layer has a wet coating thickness in a range of from 12 to 36 mils.

3. The process of claim 1, wherein said sag-free wet coating layer has a wet coating thickness in a range of from 16 to 36 mils.

* * * * *